United States Patent
Tsantilis

(10) Patent No.: US 8,091,071 B2
(45) Date of Patent: Jan. 3, 2012

(54) METHOD AND SYSTEM FOR TEMPLATE-BASED CODE GENERATION

(75) Inventor: Efstratios Tsantilis, Sinsheim (DE)

(73) Assignee: SAP, AG, Walldorf (DE)

( * ) Notice: Subject to any disclaimer, the term of this patent is extended or adjusted under 35 U.S.C. 154(b) by 1287 days.

(21) Appl. No.: 11/465,842

(22) Filed: Aug. 21, 2006

(65) Prior Publication Data

US 2008/0046868 A1  Feb. 21, 2008

(51) Int. Cl.
  G06F 9/44   (2006.01)
  G06F 9/45   (2006.01)
  G06F 11/00  (2006.01)
  G06F 17/00  (2006.01)

(52) U.S. Cl. ........ 717/120; 717/106; 717/115; 717/143; 717/144; 717/154; 714/52; 715/240; 715/256

(58) Field of Classification Search .................. None
See application file for complete search history.

(56) References Cited

U.S. PATENT DOCUMENTS

| | | | | |
|---|---|---|---|---|
| 5,675,801 A * | 10/1997 | Lindsey | .......... | 717/108 |
| 5,835,771 A * | 11/1998 | Veldhuizen | .......... | 717/154 |
| 6,292,715 B1 * | 9/2001 | Rongo | .......... | 700/249 |
| 6,742,175 B1 * | 5/2004 | Brassard | .......... | 717/107 |
| 6,886,115 B2 * | 4/2005 | Kondoh et al. | .......... | 714/52 |
| 7,073,123 B2 * | 7/2006 | Friedman et al. | .......... | 715/240 |
| 7,451,393 B1 * | 11/2008 | Herbison et al. | .......... | 715/234 |
| 7,562,292 B2 * | 7/2009 | Mashni et al. | .......... | 715/234 |
| 7,627,861 B2 * | 12/2009 | Smith et al. | .......... | 717/144 |
| 7,725,884 B2 * | 5/2010 | Ramani et al. | .......... | 717/143 |
| 7,810,028 B2 * | 10/2010 | Bell et al. | .......... | 715/256 |
| 2002/0133812 A1 * | 9/2002 | Little et al. | .......... | 717/140 |
| 2002/0178434 A1 * | 11/2002 | Fox et al. | .......... | 717/106 |
| 2003/0004979 A1 * | 1/2003 | Woodring | .......... | 707/203 |
| 2003/0229885 A1 * | 12/2003 | Gownder et al. | .......... | 717/115 |
| 2003/0236576 A1 * | 12/2003 | Resnick et al. | .......... | 700/9 |
| 2004/0015832 A1 * | 1/2004 | Stapp et al. | .......... | 717/106 |
| 2004/0015959 A1 * | 1/2004 | Kobayashi | .......... | 717/174 |
| 2004/0098704 A1 * | 5/2004 | Becker et al. | .......... | 717/115 |
| 2004/0210599 A1 * | 10/2004 | Friedman et al. | .......... | 707/102 |
| 2005/0114405 A1 * | 5/2005 | Lo | .......... | 707/200 |
| 2005/0235200 A1 * | 10/2005 | Goldberg | .......... | 715/513 |
| 2006/0048096 A1 * | 3/2006 | Jiang et al. | .......... | 717/115 |
| 2007/0226244 A1 * | 9/2007 | Chandrasekharan et al. | | 707/102 |
| 2008/0127061 A1 * | 5/2008 | Kasman et al. | .......... | 717/106 |

OTHER PUBLICATIONS

"A Service Creation Environment Based on End to End Composition of Web Services", Vikas Agarwal et al., [online], 2005, pp. 128-137, [Retrieved from Interner on Sep. 19, 2011], <http://delivery.acm.org/10.1145/1070000/1060768/p128-agarwal.pdf>.*

(Continued)

*Primary Examiner* — Thuy Dao
*Assistant Examiner* — Ziaul A Chowdhury
(74) *Attorney, Agent, or Firm* — Kenyon & Kenyon LLP

(57) ABSTRACT

A method and a system for template-based code generation. The method easily renders executable code using reusable customizable templates. The method further checks the templates for syntax errors prior to use. The system provides a memory and a processor for implementing template-based code generation.

23 Claims, 5 Drawing Sheets

OTHER PUBLICATIONS

"How to generate dynamic software infrastructures for systems biol "XML Implementation of Frame Processor", Tak Wai Wong et al., [online], 2001, pp. 164-172, [Retrieved from Internet on Sep. 19, 2011], <http://delivery.acm.org/10.1145/380000/375285/p164-wong.pdf>.* ogy: a practical example", Morris A. Swertz et al., [online], 2004, pp. 33-46, [Retrieved from Internet on Sep. 19, 2011], <http://dissertations.ub.rug.nl/FILES/faculties/science/2008/m.a.swertz/03_c3.pdf>.*

"Customized benchmark generation using MDA", Liming Zhu et al., [online], Jan. 2006, pp. 265-282, [Retrieved from Internet on Sep. 19, 2011], <http://www.cse.unsw.edu.au/~limingz/publication/JSS_MDABench_Zhu.pdf>.*

"XML and Component-Based Systems: Four Application Areas", Bryan Bentz et al., [online], Oct. 2005, pp. I-III & 1-42, [Retrived from Internet on Sep. 19, 2011], <http://www.engr.uconn.edu/~steve/Cse298300/Fall05/XMLFIN.doc>.*

* cited by examiner

Data Storage

| Name | Value |
|---|---|
| tabname | /1SGS/52BD1942/ |
| fields-name | /1BA/SCACCNAME |
|  | /1BA/SCACCOSYS |
|  | /1BA/SCACCSTAT |
|  | /1BA/SCACCSTS |
|  | /1BA/SCACCTYPE |

Template

```
DATA:
    L_TAB_DATA TYPE TABLE OF $tabname$.

SELECT * FROM $tabname$
    INTO TABLE L_TAB_DATA
    WHERE
@table fields
    @body
        $fields-name$ = L_STR_DATA-$fields-name$
    @notlast
        AND
    @last
        .
@end
```

Rendered Code

```
DATA:
    L_TAB_DATA TYPE TABLE OF /1SGS/52BD1942.

SELECT * FROM /1SGS/52BD1942
    INTO TABLE L_TAB_DATA
    WHERE
        /1BA/SCACCNAME = L_STR_DATA-/1BA/SCACCNAME    AND
        /1BA/SCACCOSYS = L_STR_DATA-/1BA/SCACCOSYS    AND
        /1BA/SCACCSTAT = L_STR_DATA-/1BA/SCACCSTAT    AND
        /1BA/SCACCSTS  = L_STR_DATA-/1BA/SCACCSTS     AND
        /1BA/SCACCTYPE = L_STR_DATA-/1BA/SCACCTYPE.
```

FIG. 2

METHOD AND SYSTEM FOR TEMPLATE-BASED CODE GENERATION

BACKGROUND

A code generation tool is an efficient, effective way for a developer to automatically render executable program code. The generation tool interprets text in a file and converts the text into executable code that may be recognized and run by an application. Such a tool advantageously saves the developer having to spend significant time and effort coding by hand.

Many such code generation tools exist, though many are problematic. For example, one of the more popular tools uses global variables, of which the developer is required to be aware and keep track when designing the code generation application. The application is therefore by necessity less portable and independent by having to reference global variables. This tool also uses a complicated inflexible syntax in the code generation application, which requires the developer to learn such a syntax.

Another of the more popular tools solves the above problems by providing local variables and less complicated syntax in a code template. The tool uses the template to create a meta-program which then renders the executable code. Code generation is then a two-stage process, i.e., from template to meta-program then from meta-program to executable code, such that the process is more complex than it need be. One example of this complexity occurs in data assignments, where the data associated with the local variables does not pass directly to the executable code from the template, but must first go through the meta-program for intermediate processing before passing to the executable code. Another example of the complexity of this two-stage process is that the template includes a mixture of code to produce the meta-program and code to produce the executable code, which may be confusing. The template is specifically created to generate a meta-program and is therefore not reusable for a different meta-program.

Accordingly, there is a need in the art for an efficient, effective way to render executable program code.

BRIEF DESCRIPTION OF THE DRAWINGS

FIG. 2 is a block diagram that depicts an example of template-based code generation according to an embodiment of the present invention.

DETAILED DESCRIPTION

Embodiments of the present invention include a method and a system for template-based code generation. The method may allow a developer to easily render executable code using reusable customizable templates. The method may further allow the developer to check the templates for syntax errors prior to using them to render the executable code. The system may provide a memory and a processor for implementing template-based code generation. A code generator, which is called a code composer in this description, may include an application programming interface (API) to access the code composer, a data manager to fill transient data storage with data associated with template variables, and a template processor to check the template and render executable code therefrom, Embodiments of the present invention advantageously provide a developer with an efficient, effective way to render program code using code templates. The templates may include simple, logical syntax that is easy to check and use. The templates may be written in a same or similar language as the generating application with a same or similar syntax, such that the developer need not learn a completely new syntax. The templates may also define local variables or refer to parameters defined in the generating application. The code composer may use data values to replace the template variables during runtime, such that the developer may customize the template for the particular generating application. Since the templates may be generic, they may be reused by different generating applications. This advantageously reduces the number of templates that need to be created.

Figure 1:
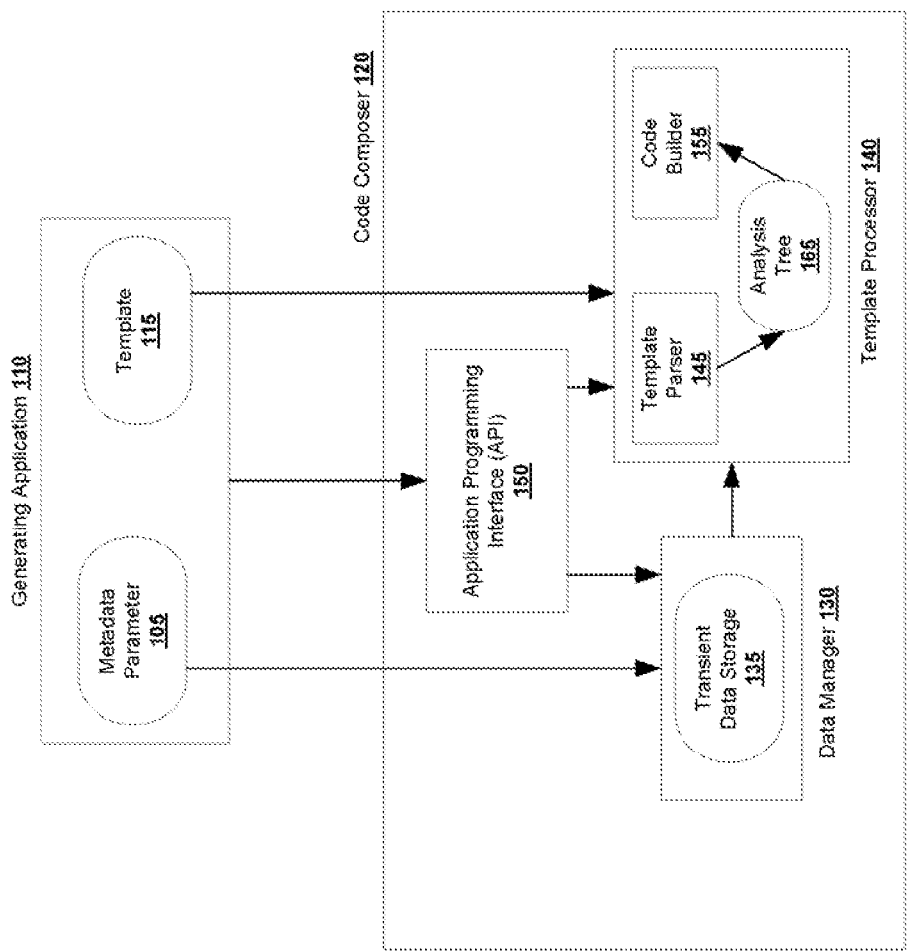
FIG. 1 is a block diagram that depicts a template-based code generation architecture according to an embodiment of the present invention.

FIG. 1 is a block diagram that depicts a template-bas code generation architecture according to an embodiment of the present invention. In this architecture, a generating application 110 may be in communication with a code composer 120. The generating application 110 may include a template 115 and metadata parameters 105 or pointers to the template and/or the parameters. The template 115 may be interpreted to render executable code. The parameters 105 may be referred to by variables in the template 115. The values of the parameters 105 may replace the template variables at runtime, thereby customizing the template 115 for the generating application 110.

The code composer 120 may include an application programming interface (API) 150, a data manager 130, and a template processor 140. The code composer 120 may interact with the generating application 110 through the API 150. The data manager 130 may include data storage 135 to be filled transiently with data according to the metadata parameters 105 from the generating application 110. The data manager 130 may store the metadata parameters 105 in the form of a (name, value) pair or any appropriate format, where the name corresponds to a variable in the template 115 and the value is to replace the variable. The template processor 140 may include a template parser 145, an analysis tree 165, and a code builder 155. The template parser 145 may parse the template 115 into a tree structure, e.g., the analysis tree 165, and check the template for syntax errors. The code builder 155 may traverse and interpret the analysis tree 165 to render the executable code therefrom.

It is to be understood that the template-based code generation architecture is not limited to that depicted in FIG. 1, but may include any components capable of template-based code generation consistent with embodiments of the present invention.

According to an embodiment of the present invention, a developer may create a template having embedded variables, static text, and directives to be interpreted by the code composer to render executable code. The variables, text, and directives may include code lines and control lines. Code lines may include static text and embedded variables that ultimately become the executable code. If the executable code is in ABAP language, an example of a code line may be "SELECT * FROM $table_name$". The static text in the code lines may be executable commands recognizable by the generating application. In this example, the static text in the code line is "SELECT * FROM," which is an ABAP (Open SQL) command to select data from a database table. Accordingly, this static text will appear in the rendered code as is for later execution by the generating application. The variable in the code lines may be replaced by data values that have been supplied to the data manager at runtime. In this example, the variable in the code line is "$table_name$," which with be replaced by an actual name of the database table containing the selectable data, e.g., PHONE_NUMBERS. The metadata parameter entry in the database manager may be "(table_name, PHONE_NUMBERS)," for example. Accordingly, the code composer interprets this code line and converts it to "SELECT * FROM PHONE_NUMBERS" in the rendered code. The generating application later executes this command to select data from a phone table.

Control lines in the template code may be directives to the code composer on how to interpret the code lines in order to render the executable code. Control lines may include a sequence of tokens, e.g., tags, variables, and/or constant text. Tags may be commands recognizable by and interpretable by the code composer, instructing the composer to perform some task. Variables may be the same as described above with respect to code lines, i.e., to be replaced by data values within the control lines. Constant text may be constant values without replacement at runtime. If the executable code is in ABAP language, an example of a control line may be "@insert $codetab$". The control line may be distinguishable from a code line by beginning with "@". In this example, the tag is "insert," which is a directive to the template processor to insert designated code and/or data at this point in the rendered code. The variable is "$codetab$," which will be replaced by an actual name of a file containing the insertable code, e.g., CHARACTER_CODE. The metadata parameter entry in the database manager may be "(codetab, CHARACTER_CODE)," for example. In this example, the code composer interprets this control line as the instruction "@insert CHARACTER_CODE" and then carries out the instruction to insert the code designated by CHARACTER_CODE into the executable code at this point. The control line itself is not inserted into the rendered code. Though, in some embodiments, a control line may be inserted without interpretation into the rendered code either for further processing by the generating application or as descriptive information to the user.

Other examples of ABAP-mapped directives to the template processor are as follows. The "if-else" block may be used to decide which of alternate sets of code should be rendered. The "case" block may be used similar to the "if-else" block. The "table" block may be used to repeat as many of certain code sections as there are entries in the designated table. The "repeat" block may be used similar to the "table" block without a designated table. The "area" block may allow the user to define and encapsulate code sections that may be reused in the same template or in other templates, e.g., a template library or storage. The "insertarea" block may refer to the code sections defined by the "area" block, processes the code, and inserts it into the rendered code at the specified location. The "nocomposer" block may be use to insert certain text that is to be ignored and not interpreted by the composer. The "set" statement may be used to set a local variable's value in the code composer, in addition to the parameters' values supplied to the data manager from the generating application. The "breakpoint" statement may be used to switch modes during code generation, e.g., to switch to a debugger mode. The "check" statement may be used to control further processing of a certain context. The "exit" statement may be used to exit the processing of the current block. The "optional" tag may be included in a control line to ignore a block if the block's metadata parameters have not yet been supplied to the data manager.

The variables in the code and control lines may be structured to carry layout and formatting options. For example, a variable may designate the parameter name and information about the corresponding data value's length to be used, the parameter name and the corresponding data value's offset location in the generated code, the parameter name and the command for determining the corresponding data value, or the parameter name and any additional information to appear thereafter in the generated codes The rendered code may include locations for the user to enhance the code by adding customized code. These locations may be called "code slots." These code slots may advantageously allow the user to add code specifically applicable to the generating application, while still using the code composer to render the majority of the code.

The rendered code may also include meta-information that is evaluable by the generating application. This meta-information may be called "annotations." The meta-information may be included in control lines in the code template, resulting in pseudo-comments in the rendered code. When the generating application runs the rendered code, the application may extract the meta-information and use it in the application as needed. For example, meta-information may include the template version number, which may be extracted from the rendered code and evaluated by the generating application, e.g. to trigger a code regeneration in case of a new template version.

The above examples are for illustration purposes and are not intended to limit the rendered code thereto. The code and control lines and the rendered code may include any text and/or syntax recognizable by the code composer and any functionality thereof in accordance with embodiments of the present invention.

While ABAP is used in the above examples, it is to be understood that the code composer may be written and/or executed in any programming language capable of rendering any kind of code or text in accordance with embodiments of the present invention.

Template-based code generation according to an embodiment of the present invention may provide many beneficial characteristics. For example, as mentioned previously, the code composer may replace variables in code lines with data values, thereby customizing the rendered code for the generating application. As such, the generic templates may be reused with multiple applications for different purposes by simply providing the required data values for each application. The code composer may also designate the parameter structures according to the data layout and format requirements of the generating application. The code composer may allow the developer great flexibility in template creation, where the template may be created to omit certain code lines and/or variables for a given circumstance and include the same lines and/or variables for another circumstance or to repeat the same code lines (as illustrated in FIG. 2) with different variables each time or to interpret certain code lines and/or variables differently depending on the position and/or number occurrence in the code.

Templates generated by the developer may be stored in a repository on the system. The code composer may then retrieve the template from the repository at runtime. In an embodiment of the present invention, the code composer may provide schemes that may be plugged into the standard editors to support commands specific to the code composer to allow users to efficiently edit the templates stored in the repository. For example, a scheme may be plugged into an ABAP editor so that the editor, after having recognized a code composer template from the template's attributes, may use the scheme to intersperse code composer statements among ABAP statements within the code lines. The plug-ins may modify the ABAP editor so that the editor handles code composer statements, which would otherwise be incomprehensible.

FIG. 2 is a block diagram that depicts an example of template-based code generation. In this example, the rendered code upon execution by the generating application selects data in specified fields from a specified table. The example template, written in ABAP language, is reproduced below with explanatory comments.

```
DATA:                           /*code line to define table*/
    L_TAB_DATA TYPE TABLE OF $tabname$.
SELECT * FROM $tabname$         /*code lines to select data from table*/
    INTO TABLE L_TAB_DATA
        WHERE
@table fields           /*@ control lines to generate code to process
                           internal table "fields"*/
    @body
    $fields-name$ = L_STR_DATA-$fields-name$    /*code lines to get
                                                  "name" field data*/
    @notlast
        \ AND    /*code line to concatenate delimiter "AND" to each line of
                    rendered code*/
    @last
        \.       /*code line to concatenate "." to last line of rendered code*/
@end    /*@ control line to end processing of table "fields"*/
```

First, the example template includes code lines that represent the head of the SELECT statement for a table that is defined by the variable "$tabname$". Then, as indicated by "@", the template includes control lines directing the code composer to iteratively access the field "name" of an internal table "fields" in order to specify the WHERE clause that depends on the fields of the table. The template includes a code line between the control lines to iteratively build the WHERE clause based on the fields stored in "$fields-name$".

In this example, the variables and corresponding data values are stored in a data manager, where they are exposed for interpretation and use by the template processor. During code generation, the code composer replaces the variables in the template with the corresponding data values. To do so, the code composer may search the metadata parameters stored in transient data storage of the data manager for parameter names that correspond to variables in the template. Upon finding the stored corresponding parameter name, the code composer may retrieve the stored data value associated with the stored parameter name from the data manager. The code composer may then replace the template variable with the retrieved data value. In this example, the variable "$tabname$" may be replaced with the value "/1SGS/52BD1942" which defines the table containing the data to be retrieved. The variable "$fields-name$" may be replaced with each of the names of the fields in table "fields" in succession during iteration. Since there are five lines in the "fields" table, the code composer will iterate five times to render the WHERE clause.

The rendered code as shown in FIG. 2 includes the replacement data values and the static text from the code lines. The rendered code includes executable code to retrieve data from the table according to the WHERE clause. The control lines themselves are not in the rendered code, in this example. The generating application may later execute the rendered code.

Figure 3:
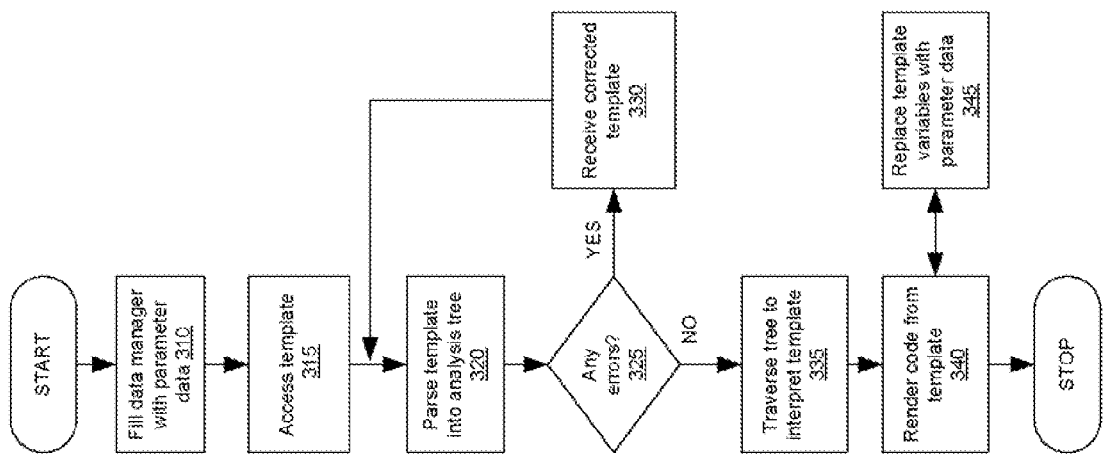
FIG. 3 is a flowchart of a code generation method in accordance with an embodiment of the present invention.

FIG. 3 is a flowchart of a code composer method for rendering executable code in accordance with an embodiment of the present invention. According to this method, a generating application 110 may instantiate the code composer 120 and fill (310) transient data storage 135 controlled by the data manager 130 with the metadata parameters 105 defined in the generating application 110, including parameter names and values. Metadata parameters 105 may correspond to variables in the template 115 that is provided by the generating application 110. The data manager 130 may store the data temporarily during the rendering of the code and, when done, release the data storage 135.

The template processor 140 of the code composer 120 may access (315) the template 115 that is provided by the generating application 110. The template parser 145 of the processor 140 may parse (320) the template into a tree structure to perform a syntax check in preparation of rendering the code. If the template has an incorrect syntax, e.g., an unknown variable, an unknown command, or an incorrectly used command, no tree structure may be built. The parser 145 may parse the template code lines and control fines into nodes of the analysis tree 165. The code lines may be parsed into static text and variables. The control lines may similarly be parsed into tokens, which may be further parsed into variables, tags, and text. The tree nodes may represent the code and control line components and the node connections may represent their syntactical relationships in the template.

If the template processor 140 detects (325) errors during the parsing, the processor 140 may generate an error report to the developer listing the nodes where errors were detected and the nature of the error. The developer may then correct the template. The code composer 120 may receive (330) a corrected template as input from the developer. The template parser 145 may then parse (320) the corrected template into an analysis tree 165 to detect errors. Template correction and parsing may be repeated until the tree is successfully built, indicating no further errors.

If there are no errors (325), the code builder 155 of the template processor 140 may traverse (335) the analysis tree 165 using any known tree analysis technique and interpret each node during traversal. The code builder 155 may render (340) the code from the analysis tree 165. During the rendering (340), the builder 155 may replace (345) template variables with the values provided by the data manager 130. To do so, the builder 155 may access the transient data storage 135 to find metadata parameters 105 stored therein where the parameter names correspond to variables in the template 115. Upon finding the corresponding parameter names, the builder 155 may retrieve the parameter data values associated with the found parameter names from the transient data storage 135. The builder 155 may then replace the variables in the template 115 with the retrieved data values. The builder 155 may interpret the code lines and convert them to executable code, which includes the static text from the code lines and the data values that replaced the code line variables. The builder 165 may also interpret the control lines and carry out the instructions thereof. The builder 165 may replace control line variables, if any, with data values.

If the builder 155 is unable to match a variable in the template 115 with a metadata parameter 105 in the transient data storage 135, the builder 155 may either abort the code rendering or ignore the template variable and continue the rendering, depending on the variable context. For example, if the template variable is in a non-optional code line or a non-optional control line, the builder 155 may abort the code rendering to avoid either producing non-executable code or following incomplete directives. On the other hand, if the template variable is in an optional code line or an optional control line, the builder 155 may ignore this code line or control line with the unmatched template variable and continue with the code rendering from the remainder of the template.

After the code is rendered, the code composer 120 may send the rendered code to the generating application 110 or another application for further processing.

Multiple applications may use the same template and customize the template for that application by using different data values to replace the variables.

In an alternate embodiment, the code composer 120 may include callback functionality, which allows the builder 155 to call back to the generating application 110 or another application during the code rendering to get data values to replace template variables based on registered callback instances. For example, the template may include a variable "${a_name}$" which instructs the builder 155 to call back to the application to get a value for this instance. The callback command may trigger the application to compute or retrieve the value and send that value to the builder 155. Upon receipt of the value, the builder 155 may include the value into the current template processing and continue the code rendering. Here, the code composer 120 having the callback function may be considered as a framework at code rendering time.

In this alternate embodiment, some of the template variables may be replaced by the values stored in the data manager 130 and other variables may be replaced by the values retrieved by the callback function during the code rendering. For example, the data manager 130 may store some parameters, e.g., key, basic, context-independent, etc., parameters, prior to rendering; whereas, the remaining parameters, e.g., context-dependent, dynamic, etc., parameters, may be retrieved by callback during rendering.

In another alternate embodiment, replacement data values for all the template variables may be received solely from callbacks during the rendering.

Figure 4:
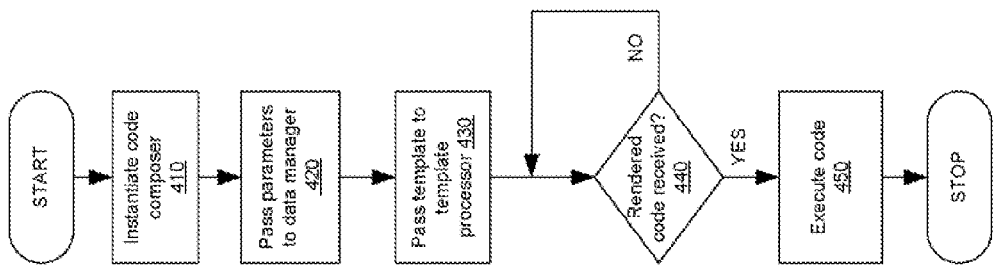
FIG. 4 is a flowchart of a generating application method in accordance with an embodiment of the present invention.

FIG. 4 is a flowchart of a generating application method in accordance with an embodiment of the present invention. The generating application 110 may instantiate (410) the code composer 120 and pass (420) metadata parameters 105 to the code composer's data manager 130 to fill with the data that are referred to by the variables within the template.

The generating application 110 may pass (430) the template 115 to the code composer's template processor 140 to render the code from the template. The generating application 110 may await (40) the rendered code from the code composer 120. Upon receipt, the generating application 110 may execute (450) the rendered code or store it for later execution.

Figure 5:
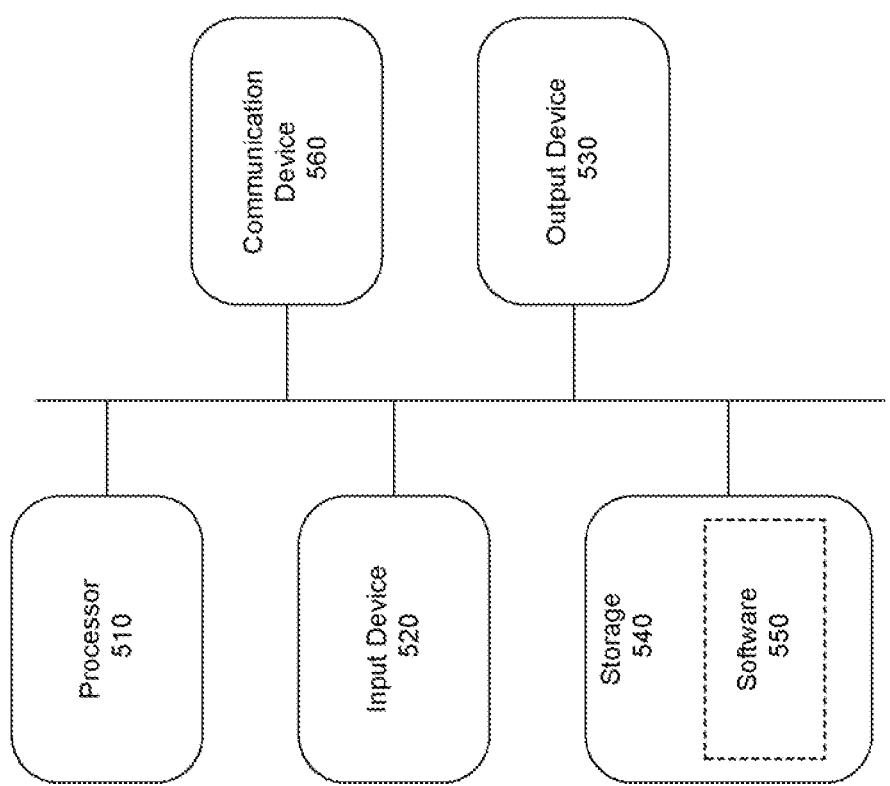
FIG. 5 is a block diagram that depicts a computing device for implementing a method in accordance with an embodiment of the present invention.

FIG. 5 illustrates the components of a basic computing device in accordance with an embodiment of the present invention. The computing device may be a personal computer, workstation, handheld personal digital assistant ("PDA"), or any other type of microprocessor-based device. The computing device may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of the computing device may be connected via an electrical bus or wirelessly.

Software 550, which may be stored in storage 540 and executed by processor 510, may include, for example, the application programming that embodies the functionality of the present invention.

The network connecting the computer components may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 550 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method comprising:
    registering, by a computer processor, callback functions for selected template variables;
    selecting, by the computer processor, a reusable customizable template to render program code;
    parsing, by the computer processor, the reusable customizable template, the reusable customizable template including code lines and control lines, wherein the code lines are parsed into static text and variables to be rendered in the program code, the control lines are parsed into tokens that are further parsed into variables, tags and constant text;
    building, by the computer processor, an analysis tree to represent the parsed template, the analysis tree having tree nodes formed by components from the parsed code lines and control lines, wherein the tree nodes are connected according to syntactical relationships in the template;
    analyzing, by the computer processor, the parsed tags, variables, static text and constant text individually and in combination for syntax errors;
    if errors are detected, generating, by the computer processor, an error report listing the nodes containing the errors;
    if no error is detected,
        finishing, by the computer processor, building the analysis tree;
        dynamically replacing, by the computer processor, generic data variables in the reusable customizable template with custom data, wherein for each of the generic data variables that matches a selected template variable with a registered callback function and the matched generic data variable is replaced by a value retrieved by the registered callback function; and rendering, by the computer processor, the program code from the reusable customizable template including the custom data.

2. The method of claim 1, wherein the static text includes commands recognizable by an application that is to execute the rendered code, the tags are to control the rendering of the program code.

3. The method of claim 1, wherein the replacing comprises:
identifying in memory names and associated values corresponding to the variables; and
dynamically replacing the variables with the identified values.

4. The method of claim 1, further comprising:
replacing the variables with the custom data at runtime.

5. The method of claim 1, further comprising:
reusing the reusable customizable template with different custom data to render different program code.

6. The method of claim 1, further comprising:
receiving a corrected template with the syntax errors corrected; and
repeating the parsing and the analyzing of the corrected template.

7. The method of claim 1, wherein the analyzing comprises:
analyzing for syntax errors which comprise at least one of an unknown variable, an unknown command, or an incorrectly used command.

8. The method of claim 1, further comprising:
accessing a database comprising parameter names and associated data values;
matching one or more of the variables with corresponding parameter names in the database;
replacing the matched variables with data values in the database that are associated with the matched corresponding parameter names.

9. The method of claim 8, further comprising:
during the rendering,
calling to an application for one or more data values, and including the called data values in the program code.

10. A system comprising:
a memory for storing a plurality of reusable customizable templates and associated custom data; and
a processor in communication with the memory to
register callback functions for selected template variables;
retrieve at least one of the templates from memory to render program code,
parse the at least one template, the at least one template including code lines and control lines, wherein the code lines are parsed into static text and variables to be rendered in the program code, the control lines are parsed into tokens that are further parsed into variables, tags and constant text;
build an analysis tree to represent the parsed template, the analysis tree having tree nodes formed by components from the parsed code lines and control lines, wherein the tree nodes are connected according to syntactical relationships in the template;
analyze the parsed tags, variables, static text and constant text individually and in combination for syntax errors;
if errors are detected, generate an error report listing the nodes containing the errors;
if no error is detected,
finish building the analysis tree;
replace variables in the parsed template with the associated custom data,
wherein for each of the variables that matches a selected template variable with a registered callback function and the matched variable is replaced by a value retrieved by the registered callback function, and render the program code from the parsed template.

11. The system of claim 10, wherein the processor is to:
receive user-added data comprising customized program code; and
place the customized program code among the rendered program code.

12. The system of claim 10, wherein the processor is to:
provide the rendered program code for later execution by a calling application.

13. The system of claim 10, wherein the processor is to:
render different program code from the retrieved template and different associated custom data.

14. The system of claim 10, wherein the processor is to:
render different program code from another one of the templates and the associated custom data.

15. A non-transitory computer readable storage medium storing thereon program instructions that, when executed, cause an executing device to:
register callback functions for selected template variables;
select a reusable customizable template to render program code;
parse the reusable customizable template, the reusable customizable template including code lines and control lines, wherein the code lines are parsed into static text and variables to be rendered in the program code, the control lines are parsed into tokens that are further parsed into variables, tags and constant text;
build an analysis tree to represent the parsed template, the analysis tree having tree nodes formed by components from the parsed code lines and control lines, wherein the tree nodes are connected according to syntactical relationships in the template;
analyze the parsed tags, variables, static text and constant text individually and in combination for syntax errors;
if errors are detected, generate an error report listing the nodes where the errors being detected;
if no error is detected,
finish building the analysis tree;
dynamically replace generic data variables in the reusable customizable template with custom data , wherein for each of the generic data variables that matches a selected template variable with a registered callback function and the matched generic data variable is replaced by a value retrieved by the registered callback function; and
render the program code from the reusable customizable template including the custom data.

16. The non-transitory computer readable storage medium of claim 15, wherein the static text includes commands recognizable by an application that is to execute the rendered code, the tags are to control the rendering of the program code.

17. The non-transitory computer readable storage medium of claim 15, wherein to replace generic data variables comprises:
identifying in memory names and associated values corresponding to the variables; and
dynamically replacing the variables with the identified values.

18. The non-transitory computer readable storage medium of claim 15, wherein the program instructions, when executed, further cause the executing device to replacing the variables with the custom data at runtime.

19. The non-transitory computer readable storage medium of claim 15, wherein the program instructions, when executed, further cause the executing device to reuse the reusable customizable template with different custom data to render different program code.

20. The non-transitory computer readable storage medium of claim 15, wherein the program instructions, when executed, further cause the executing device to:
- receive a corrected template with the syntax errors corrected; and
- repeat the parsing and the analyzing of the corrected template.

21. The non-transitory computer readable storage medium of claim 15, wherein the syntax errors comprise at least one of an unknown variable, an unknown command, or an incorrectly used command.

22. The non-transitory computer readable storage medium of claim 15, wherein the program instructions, when executed, further cause the executing device to:
- access a database comprising parameter names and associated data values;
- match one or more of the variables with corresponding parameter names in the database; and
- replace the matched variables with data values in the database that are associated with the matched corresponding parameter names.

23. The non-transitory computer readable storage medium of claim 15, wherein the program instructions, when executed, further cause the executing device to:
- during the rendering of the program code,
  - call to an application for one or more data values, and
  - include the called data values in the program code.

* * * * *